Sept. 5, 1961

R. J. S. BROWN 2,999,203

NUCLEAR MAGNETISM LOGGING METHOD AND APPARATUS

Filed Oct. 31, 1955

INVENTOR
ROBERT J. S. BROWN

BY
ATTORNEYS

INVENTOR
ROBERT J. S. BROWN
BY
ATTORNEYS

United States Patent Office 2,999,203
Patented Sept. 5, 1961

2,999,203
NUCLEAR MAGNETISM LOGGING METHOD
AND APPARATUS
Robert J. S. Brown, Fullerton, Calif., assignor to California Research Corporation, San Francisco, Calif., a corporation of Delaware
Filed Oct. 31, 1955, Ser. No. 543,967
11 Claims. (Cl. 324—.5)

The present invention relates to nuclear magnetism well logging and more particularly to a method of reducing the effect of possible sources of magnetic field inhomogeneities on a nuclear magnetism signal induced in atomic particles, having nuclear magnetic moments, within an earth formation traversed by a well bore where said signal is used to identify a characteristic of the earth formation, such as the liquids therein.

It is an object of the present invention to provide a method of reducing the effect of magnetic materials, such as magnetite, on the electrical signal induced in a bore hole when protons in an earth formation precess under the influence of the earth's magnetic field after the establishment and interruption of a polarizing field in an earth formation. In accordance with the invention, the polarizing field is established by passing a direct current through a field coil positioned in the well bore. Direct current flows through said polarizing coil until selectively interrupted. Current flow is then reversed in direction after a predeterminable time interval. Prior to stopping current flow in said coil, the current in further caused to oscillate while being reduced to zero amplitude so as to demagnetize the magnetic particles causing inhomogeneities in the earth's magnetic field in the earth formation. The transient electrical signal induced in the well bore by in phase precession of protons in said earth formation, under the influence of the earth's magnetic field and substantially independently of the effect of magnetic materials therein, is observed as an indication of a physical characteristic of said formation.

Many sedimentary rocks contain magnetite or other magnetic materials. Magnetite, for example, is frequently associated with sandstone. Since sandstones are an important reservoir rock for petroleum, the presence of magnetic inhomogeneities therein arising from magnetite and the like makes it difficult to investigate the liquid content by nuclear magnetism logging. In nuclear magnetism logging the presence of magnetite or other magnetic particles, whether paramagentic, antiferromagnetic, ferrimagnetic, or ferromagnetic, produce magnetic inhomogeneities in that portion of the earth formations where it is desired to detect precession of atomic particles having nuclear magnetic moments. This effect is greatly emphasized by the action of the polarizing field. In patricular, it has been found that when a magnetic polarizing field is established in the earth formation and then suddenly interrupted, the residual magnetism of the magnetic particles in the earth formation adversely affects the detection of the signal induced by nuclear magnetic particles, such as protons. This effect is such that the protons may not be able to precess under the influence of the earth's magnetic field in phase for a time long enough to generate a usable electromagnetic signal from such precession. Accordingly, a measurable characteristic of the induced signal, such as decay time or amplitude, cannot be measured and recorded as an indication of one of the properties of the earth formation, such as its liquid content.

As disclosed in applicant's joint application with Stanley B. Jones, Serial No. 531,243, filed August 29, 1955, magneitc materials, such as magnetite, may be added to the drilling fluid to permit identification of liquids in situ as distinguished from those in the bore hole. In accordance with the teaching in said application, the magnetic material is added to the bore hole fluids to permit exact compensation for the unknown geometry of the well bore when signals from the in phase precession of protons in both the formation and the well bore cannot otherwise be distinguished. Accordingly, where such magnetic material has been added, or otherwise enters the well bore, the present method permits demagnetization of all such magnetic materials whether in the earth formation or in the drilling fluid. Thus a usuable signal is obtained from the drilling fluid after demagnetization but its duration is markedly different from that of the signal from the formation as described in the above-mentioned copending application.

In accordance with a preferred method of carrying out the present invention, the effect of magnetized magnetic minerals on nuclear magnetism signals from earth formations containing the minerals is reduced by controlling current flow through the polarizing coil after interruption of the current supply thereto, thereby prolonging the induced in phase precession of protons acting under the influence of the earth's magnetic field. By substatially prolonging this in phase precession, the observation of the induced signal is greatly facilitated. In accordance with said preferred method, an alternating current of decreasing magnitude is applied to the polarizing coil after a predeterminable time interval so that the current flow in the coil is decreased to zero after one or more cycles. Thus, the current flow and the polarizing field associated therewith is successively reversed, and finally brought to zero before measurement of the induced electrical signal.

In a preferred form of apparatus for carrying out the method of the present invention, the polarizing coil is connected to a direct current source through switch means. An oscillating current control means, such as a parallel capacitance, is connected in circuit with said coil so that when current flow thereto is interrupted the polarizing field will likewise oscillate. Preferably said oscillatory circuit is provided by the distributed capacitance of the coil as well as the normal inductance and resistance thereof. Alternatively, the capacitance is provided by a condenser connected in parallel with the polarizing coil. Said oscillatory circuit is arranged so that when the D.C. power to the polarizing coil is interrupted an alternating current of decreasing amplitude is applied to the coil. Preferably the natural frequency of said oscillatory circuit is substantially higher than the nuclear precession frequency of the protons generating the nuclear magnetism signal characteristic of the earth formation.

Alternatively, apparatus for carrying out the method includes a polarizing circuit having a further current control means, such as a nonlinear resistor, connected in parallel with the condenser and the polarizing coil. Such nonlinear resistor permits the polarizing current to decay over a predeterminable time interval after interruption of the power supply to the coil. Desirably, the nonlinear resistor provides a moderate resistance path to pass current immediately after the switch opens to absorb the energy stored in the inductance of said polarizing coil. Thus, after the direct current is interrupted, the field induced by the polarizing coil is decreased gradually. Said nonlinear resistor may be of the thyrite type, or may include a plurality of constant-potential gas tubes connected in series.

Further objects and advantages of the present invention will become apparent from the following detailed description taken in conjunction with the accompanying drawings:

In the drawings FIG. 1 is a schematic representation of a nuclear magnetism logging system adapted to carry out the method of the present invention and illustrates diagrammatically one circuit suitable for the performance of said method.

Figure 1:
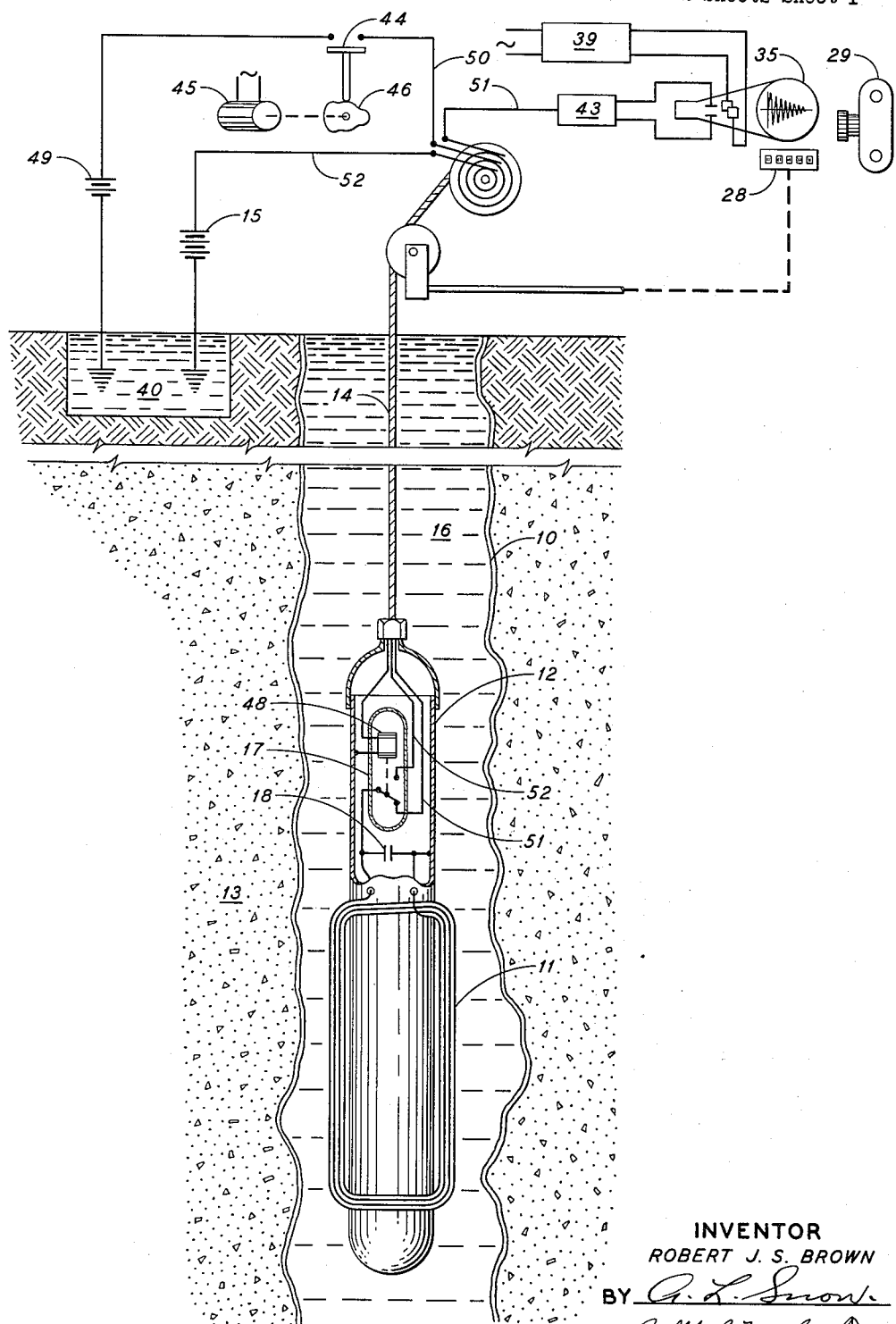

Referring now to the drawings and in particular to FIG. 1, there is shown one form of apparatus for performing the method of the present invention. As there seen, nuclear magnetism well logging measurements are made on a portion of the earth formation lying along well bore 10. In the performance of this method, a polarizing field coil 11, supported by and external to a nonmagnetic logging sonde 12, is brought adjacent an earth formation 13 by properly positioning field coil 11 in this position, a direct current is supplied thereto by a power source, such as battery 15, connected to polarizing coil 11 through switch means 17. Direct current flow in coil 11 establishes magnetization of formation 13 to align or polarize the responsive atomic particles having nuclear magnetic moments, such as hydrogen atoms within that field, including drilling fluid 16. Following such magnetization, the current flow from battery 15 to polarizing coil 11 is normally interrupted by the rapid opening of switch means 17. With interruption of the polarizing current, continued current flow, due to inductance of the field coil, is normally reduced to zero as rapidly as possible. Thus, the magnetic nuclei in the magnetized earth formation precess under the influence of the earth's magnetic field. To accomplish this, it is necessary that the nonuniform magnetization of the earth formation be reduced to substantially zero, so that the residual field due to magnetization of mineral grains is sufficiently weak to permit the earth's magnetic field undistorted to interact with the nuclei or protons in said field. Where magnetic inhomogeneities such as magnetite particles do not exist in appreciable quantity in the earth formation, the interruption of current through the polarizing field coil and the rapid dissipation of current flowing in the coil thereafter, normally permits observation of the electromagnetic signal induced by said precession. This signal is detected either by connecting the polarizing coil to a measuring circuit, as in FIG. 1, or by positioning another signal coil (not shown), independent of said polarizing coil, at the same elevation in the well bore.

However, as mentioned above, where magnetic inhomogeneities, e.g. magnetite particles, exist in considerable quantity in the formation, as frequently occurs in sandstones and other sedimentary rocks forming petroleum reservoirs, it has been found that a nuclear magnetism signal cannot be obtained of sufficient duration to permit observation thereof. It has been found, in accordance with the present invention, that a nuclear magnetism signal of adequate duration and amplitude may be generated even in the presence of magnetic materials by reversal, and where necessary oscillation, of the polarizing current flowing in field coil 11 prior to cessation of current flow therein. In this way, the nuclear magnetism signal may be observed and recorded substantially independently of the magnetic materials in the formation.

For this purpose, as shown in FIG. 1, a parallel condenser 18 is connected in parallel with polarizing coil 11 so that they form an oscillatory circuit when switch means 17 is opened. The size of condenser 18 is desirably selected so that the frequency of oscillating current flowing between coil 11 and capacitance 18 is substantially higher than the natural precessional frequency of protons in the earth's magnetic field at the point under investigation. Desirably this frequency is somewhat higher than 2 kc., so that the macroscopic magnetic moment of the precessing nuclei will not follow the oscillations of the polarizing field with consequent deleterious effect on the signal generated by the precession of the macroscopic moment in the earth's magnetic field after cessation of the polarizing field.

Figure 2:
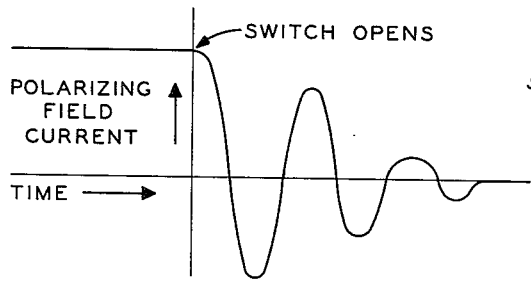
FIG. 2 is a graph of the polarizing current flow in coil 11 plotted against time, useful in explaining the present method as it may be performed with the apparatus of FIG. 1.

The operation of the circuit of FIG. 1 is particularly illustrated in the graph of FIG. 2. As there shown, the polarizing field coil current is applied for a predetermined time interval by holding closed switch 17. Switch 17 is desirably of the vacuum type to reduce arcing between the contacts when abruptly opened. Supply of the power from battery 15 to polarizing coil 11 is then interrupted at the time indicated in FIG. 2. When switch 17 is thus opened, current flow from polarizing coil 11 continues in the same direction for a short time due to its internal inductance. Then condenser 18 becomes charged so that said current flow is then reversed in direction and oscillates through a number of cycles. The number of said cycles, of course, is determined by the time constants of the LRC circuit formed by coil 11 and condenser 18. Since the duration of the oscillating field must be less than the decay time of the measured signal, the time constant of the circuit must be made quite short. Accordingly, the resistance of the oscillatory circuit is made relatively high.

It will be understood that the capacitance means illustrated in FIG. 1 may be supplied by the distributed capacity of the polarizing coil itself. Where said polarizing coil is several feet in length and has several hundred turns, the L and C may be easily adjusted to provide the desired oscillatory circuit. Desirably, the frequency of such an oscillatory circuit, including the capacitance in the polarizing coil, may be 12 kc., where the polarizing coil has a length of 5 feet, a width of 6 inches, and is wrapped with 72 turns of No. 10 wire. The resistance of said coil is about one ohm.

Figure 5:
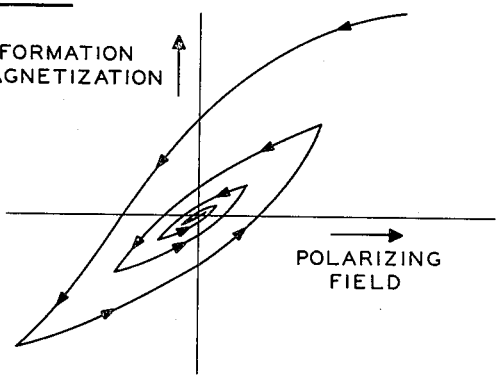
FIG. 5 is a graph of the magnetization of an earth formation plotted against polarizing field strength, useful in explanation of the operation of the method of this invention.

As further shown in FIG. 2, the current in field coil 11, after several reversals is brought to substantially zero within a predeterminable time interval. The effect of such current reversal is best understood by reference to FIG. 5, wherein magnetization of the formation has been plotted against the polarizing field as represented by current flow in polarizing coil 11. As shown by the curve of FIG. 5, it will be noted that the magnetic hysteresis loop is gradually reduced, so that the remaining magnetization in the formation, and especially in the particles of magnetic materials having large susceptibilities, will be reduced to substantially zero after said reversal. In accordance with the present invention, said demagnetization of the earth formation, however, does not appear to greatly affect the electromagnetic signal induced by the gyromagnetic particles, measured as an indication of one of the properties, or characteristics, of the earth formation. In particular, the signal induced by in phase precession of protons under the influence of the earth's magnetic fields is particularly indicative of the liquids in the earth formation. Identification of the liquid content, or the distinction between water and hydrocarbons in said formation, is thus derived from the amplitude of the electrical signal as measured for various duration times of the polarizing current.

Figure 3:
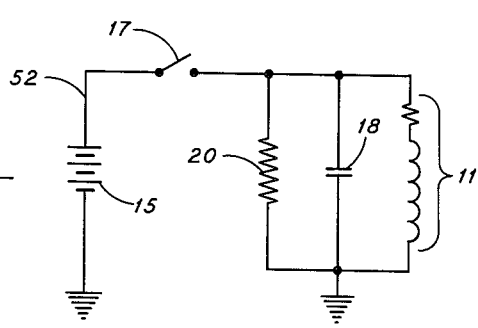
FIG. 3 is a diagram of an alternative electrical circuit useful in the arrangement shown in FIG. 1.

Referring now to the arrangement of FIG. 3, there is shown an alternative form of apparatus to the circuit shown in FIG. 1. A nonlinear resistor 20 such as thyrite is desirably connected in parallel with the polarizing coil, and if an external capacitance, such as parallel condenser 18 is employed, this resistor is likewise in parallel thereto.

Figure 4:
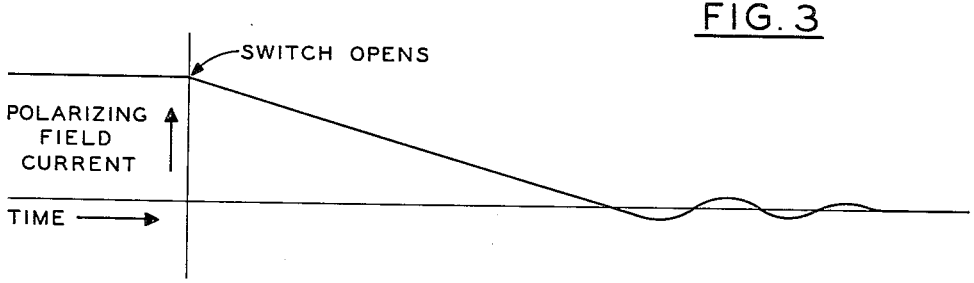
FIG. 4 is a polarizing current versus time graph, similar to FIG. 2, and useful in explaining the operation of the method performed by the apparatus of FIG. 3.

The purpose of thyrite resistor 20 to control decay of polarizing current in coil 11 is particularly shown in the diagram of FIG. 4. As there seen, the thyrite resistor 20 serves to absorb and dissipate the residual current from polarizing coil 11, after the current to the polarizing field coil is interrupted by opening switch 17. It is to be noted that the magnetizing current is permitted to decrease on a ramp function of relatively long-time delay. When the potential across nonlinear resistor 20 approaches its threshhold value, condenser 18 and field coil 11 interact to set up an oscillatory polarizing current flow through the field coil. This is illustrated by the reversal in the polarizing field illustrated as a decaying A.C. signal in the right hand portion of FIG. 4.

With the arrangement of FIG. 3, there is made possible observation of the signal induced in the well bore by precession of protons, after the polarizing field has been gradually reduced to zero. This system provides an alternative method to that disclosed in connection with FIG. 1. In the FIG. 3 system, the polarizing current in field coil 11 need not be removed as rapidly as in the FIG. 3 system to permit observation of the precession of protons in an earth formation having magnetic inhomogeneities. The system shown in FIG. 3 is preferable where a great deal of magnetic material is present in the formation rock. Alternatively, a plurality of constant-potential tubes, such as the cold cathode type, may be substituted for thyrite resistor 20.

Figure 6:
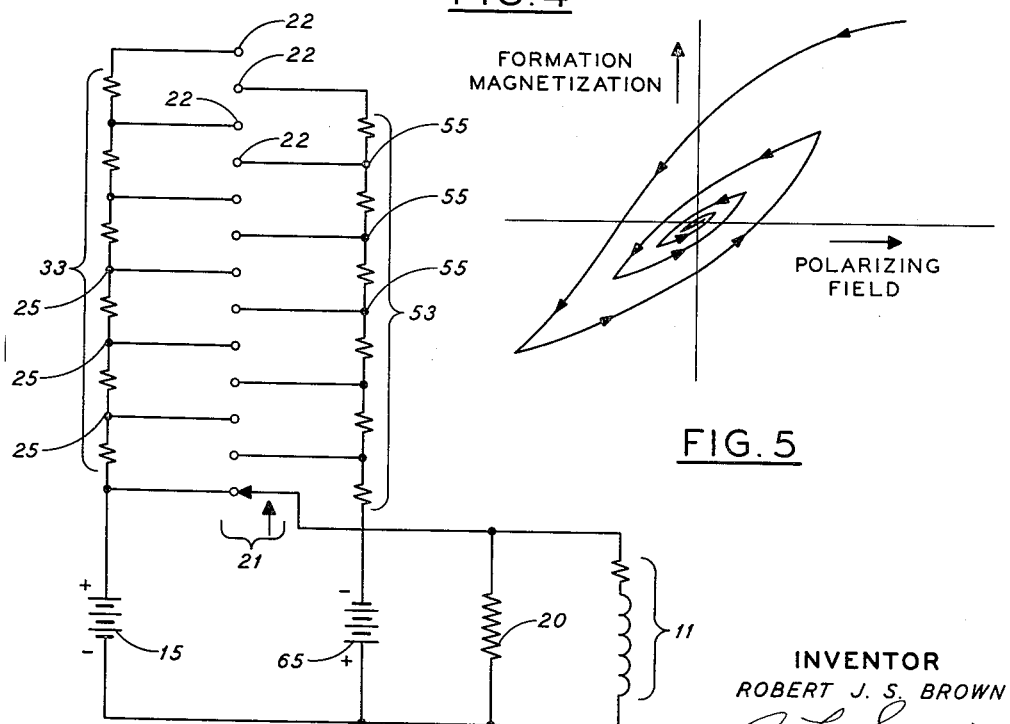
FIG. 6 is a circuit diagram illustrating another form of apparatus useful in carrying out the method of the present invention.

In the arrangement of FIG. 6, there is illustrated another form of apparatus for carrying out the method of the present invention. The system of FIG. 6 includes a multiple switching arrangement for periodically, or cyclically, reversing the polarizing current flowing in the field coil after initial interruption of the main current source, battery 15. As there illustrated, the successive potentials of decreasing amplitude are supplied to polarizing coil 11 by switch 21. The contacts 22 of switch 21 are connected to potentiometers 33 and 53 having taps 25 and 55 respectively on batteries 15 and 65. These taps are proportioned with respect to the inductance and resistance of the polarizing coil so that there is generated the desired reversals of current flow through said coil 11. It will thus be seen that there is made possible the desired reversal and alternating of potential across the polarizing coil to demagnetize the magnetic particles, whether in the earth formation under investigation or in the bore hole fluid.

From the various forms of apparatus disclosed hereinabove it will be seen that the method of this invention may be performed by various electrical circuits adapted to reverse the current flow in the polarizing coil and the magnetic field in a predeterminable manner after the main polarizing field has been established. Thus, the formation is demagnetized to reduce substantially the effect of magnetic materials in the formation on the precession of protons or other gyromagnetic particles in the formation under the influence of the earth's magnetic field. The signal induced in the well bore by this in phase precession, when of sufficient magnitude and occurring over a period sufficiently long, may be observed and recorded whereby the amplitude or other characteristics thereof may be utilized as an indication of a physical property of the earth formation. In particular, the initial amplitude of the nuclear magnetism signal may be measured as an indication of the liquid content of said formation. Alternatively, the rate of decay of the electrical signal induced by precession of protons in liquids within the earth formation, may be measured as an indication of whether said protons are in oil or water. Preferably, where magnetite or other sources of inhomogeneities are present in the field, the thermal relaxation time of the induced electrical signal, as derived from signal intensity, is measured as a function of the duration of the polarizing current, and used as an indication of the presence of oil, as well as water.

The recording system as shown in FIG. 1 provides means for indicating at the earth's surface one of the characteristics of the induced electrical signal for correlation with the depth of logging sonde 12 and polarizing coil 11 in well bore 10. As particularly shown in FIG. 1, the depth of coil 11 is recorded by depth meter 28 driven by cable 14. The electrical signal may be recorded photographically, as by camera 29, which is positioned to record both the depth measurement on recorder 28 and the electrical signal displayed on face 35 of cathode ray tube 36. As indicated schematically, the horizontal deflection of the cathode ray beam in tube 36 is generated as a function of time by horizontal deflection amplifier 39. The vertical deflection of the beam corresponds to both the amplitude and the frequency of the signal supplied by amplifier 43. Amplifier 43 is connected to coil 11 through line 51, while current flow from source 15 over line 52 is interrupted.

In the operation of the polarizing circuit, including vacuum switch means 17, energizing relay or solenoid 48 of said vacuum switch is remotely operated by timing switch means 44 in response to timing motor 45 and cam 46. It will be seen that timing switch 44 operates to connect solenoid 48 to a power source, such as battery 49 through lead 50 of cable 14 and ground return by sonde 12, drilling fluid 16 and mud pit 40. In this arrangement, timing switch 45 opens and closes cyclically, as the polarizing coil 11 is positioned opposite a formation whose physical characteristic is to be measured. Cam 46 closes switch 44 for a predeterminable time interval and then the current flow in the polarizing coil is controlled to return to zero, in accordance with the method of the present invention. As further shown in FIG. 1, cam 46 is arranged to close and open switch 44 and vacuum switch means 17, so that the polarizing current flows for two different periods of time. These periods of time are selected so that one is quite long as compared to the other. Thus, the thermal relaxation time of the induced signal may be derived from signal intensity as a function of polarizing time.

While various modifications and changes in both the method and apparatus for applying the present invention to nuclear magnetism logging will occur to those skilled in the art, all such modifications and changes falling within the scope of the appended claims are intended to be included therein.

I claim:
1. The method of reducing the effect of magnetic materials in an earth formation traversed by a well bore on a nuclear magnetism signal to permit identification of a physical characteristic thereof which comprises the steps of applying a magnetic polarizing field to a portion of said earth formation by positioning a polarizing field coil in said well bore adjacent said formation containing said magnetic materials, flowing a direct current through said polarizing coil, decreasing the amplitude of said direct current to substantially zero in a predeterminable time interval, then reversing the direction of current flow through said polarizing field coil to apply an alternating current of decreasing amplitude for at least one cycle through said polarizing coil prior to cessation of current flow in said coil, and then detecting the electrical signal induced in said coil by the in phase precession of protons in said earth formation under the influence of the earth's magnetic field as an indication of said physical characteristic of said earth formation and substantially independent of the effect of said magnetic materials in the earth formation on said induced signal.

2. The method of reducing the effect of magnetic materials in an earth formation on a nuclear magnetism signal induced within said formation which comprises the steps of applying a magnetic polarizing field within at least a portion of said earth formation containing said magnetic material by positioning a polarizing field coil in said well bore within said formation, flowing a direct current through said polarizing coil to establish said magnetic polarizing field in said formation external to said coil, decreasing the amplitude of said direct current to substantially zero in a predeterminable time interval, reversing the direction of current flow through said polarizing coil and increasing the amplitude to a predeterminable value and then decreasing the amplitude of said current flow, whereby the effect of the magnetic materials in said earth formation on the electrical signal induced by precession of protons under the influence of the earth's magnetic field is substantially reduced, and then recording a characteristic of said electrical signal in accordance with the depth of said coil in said well bore as an indication of the liquids within said earth formation.

3. The method in accordance with claim 2 wherein said predeterminable time interval is substantially zero and said reversal of current flow is effected by applying an alternating potential of decreasing amplitude to said polarizing coil.

4. The method in accordance with claim 2 in which said reversal of current flow is applied to said polarizing coil after the polarizing current has been reduced over a predeterminable time delay and said value of the reversed current flow is substantially less than the current amplitude during polarization of said earth formation.

5. The method of identifying a property of the liquids in an earth formation having magnetic materials and being traversed by a well bore which comprises the steps of applying a magnetic polarizing field within said earth formation which includes positioning a polarizing coil in said well bore adjacent said formation containing said magnetic materials, flowing a direct current of predetermined amplitude through said polarizing coil to establish said magnetic polarizing field external to said coil, and decreasing the amplitude of said current flow to substantially zero over a predeterminable time interval, then applying an alternating current of decreasing amplitude to said coil, said alternating current having a frequency higher than the nuclear precession frequency of protons in liquids within said formation in the earth's magnetic field, decreasing the amplitude of said alternating current to substantially zero after a plurality of cycles of current flow through said coil to demagnetize the magnetic materials in said earth formation, and then measuring an electrical characteristic of the signal induced in said coil by nuclear precession of said protons within said earth formation under the influence of earth's magnetic field, and recording said characteristic as an indication of said property of the liquids in said formation, said recording being in accordance with the depth of said polarizing coil in said well bore.

6. Apparatus for reducing the effect of sources of magnetic field inhomogeneities such as magnetite particles in an earth formation on a nuclear magnetism signal induced by protons precessing within said formation which comprises a polarizing field coil adapted to traverse a bore hole, a direct current supply connected to said coil, switch means for applying and interrupting a magnetic polarizing current flow in said field coil, capacitance means connected in circuit with said coil to oscillate current flow through said polarizing coil and decrease the amplitude thereof to a predeterminable value when said switch means is opened whereby the effect of the polarizing field on magnetic particles in said earth formation is substantially minimized, means for detecting the electrical signal induced by precession of protons in said earth formation under the influence of the earth's magnetic field after the polarizing field has been removed, and means for recording said electrical signal in accordance with the depth of said coil in said well bore as an indication of the formation liquids.

7. Apparatus for reducing the effect of sources of magnetic field inhomogeneities such as magnetite particles in an earth formation on a nuclear magnetism signal induced by protons precessing within said formation which comprises a polarizing field coil adapted to traverse a bore hole, cable means for positioning said polarizing field coil in said well bore adjacent said formation, a direct current source connectable to said coil, switch means for applying and interrupting a magnetic polarizing current flow from said source to said field coil, first current control means operable when said switch means is opened to decrease the amplitude of said direct current to substantially zero over a predeterminable time interval, and further current control means connected in circuit with said coil to oscillate current flow through said polarizing coil and decrease the amplitude thereof to a predeterminable value after said switch means is opened whereby the effect of the magnetic particles in said earth formation on the electrical signal induced by in phase precession of protons under the influence of the earth's magnetic field is substantially reduced, and means for recording said electrical signal in accordance with the depth of said coil in said well bore as an indication of the formation liquids.

8. Apparatus in accordance with claim 7 in which said first current control means includes the internal resistance of said coil and said further current control means includes the distributed capacitance of said coil.

9. Apparatus in accordance with claim 7 in which said first current control means includes another direct current source and said further current control means includes switch means for alternately connecting said coil to the first-named source and said other source in opposite polarities.

10. Apparatus in accordance with claim 7 in which said first current control means includes a nonlinear resistance and said further current control means includes capacitance means connected in parallel with said coil.

11. Apparatus for identifying the liquids of an earth formation traversed by a well bore which comprises a polarizing field coil for applying a magnetic polarizing field within said earth formation, cable means for positioning said polarizing coil in said well bore adjacent said formation, a polarizing current supply means, switch means for interrupting said polarizing current flow to said coil, capacitance means in circuit with said coil for immediately reversing the direction of flow of current through said coil and then subsequently restoring the direction of current flow to its original direction, and resistance means in circuit with said coil and said capacitance means for decreasing the amplitude of said current to substantially zero, means for measuring the electrical signal induced by in-phase precession of protons in fluids within said earth formation in earth's magnetic field after said polarizing current flow has been stopped, and means for recording a characteristic of said electrical signal as an indication of the liquids in said formation, said recording means including means operable by said cable means for measuring the depth of said polarizing coil in said well bore.

References Cited in the file of this patent

UNITED STATES PATENTS

| | | |
|---|---|---|
| 2,359,894 | Brown et al. | Oct. 10, 1944 |
| 2,561,490 | Varian | July 24, 1951 |
| 2,856,579 | Packard | Oct. 14, 1958 |